United States Patent [19]

Sakurai et al.

[11] 4,387,045

[45] Jun. 7, 1983

[54] OLEFIN POLYMERIZATION CATALYST AND A PROCESS FOR PRODUCING POLYOLEFINS BY THE USE OF SAID CATALYST

[75] Inventors: Hisaya Sakurai, Kurashiki; Hideo Morita, Yokohama; Tadashi Ikegami; Masayasu Furusato, both of Kurashiki, all of Japan

[73] Assignee: Asahi Kasei Kogyo Kabushiki Kaisha, Osaka, Japan

[21] Appl. No.: 269,062

[22] PCT Filed: Aug. 1, 1979

[86] PCT No.: PCT/JP79/00203

§ 371 Date: Apr. 1, 1981

§ 102(e) Date: Mar. 30, 1981

[51] Int. Cl.³ .............................. C08F 4/04; C08F 4/02
[52] U.S. Cl. .............................. 252/429 B; 252/429 C
[58] Field of Search ........................ 252/429 B, 429 C

[56] References Cited

U.S. PATENT DOCUMENTS

| | | | |
|---|---|---|---|
| 3,676,418 | 7/1972 | Tashiro et al. | 252/429 B |
| 3,784,481 | 1/1974 | Lassau et al. | 252/429 B |
| 3,917,575 | 11/1975 | Mattsuura et al. | 252/429 C |
| 3,989,878 | 11/1976 | Aishima et al. | 252/429 C |
| 4,004,071 | 1/1977 | Aishima et al. | 252/429 C |
| 4,027,089 | 5/1977 | Aishima et al. | 252/429 B |
| 4,159,256 | 6/1979 | Sakurai et al. | 252/429 B |
| 4,159,963 | 7/1979 | Sakurai et al. | 252/429 B |
| 4,159,965 | 7/1979 | Sakurai et al. | 252/429 B |
| 4,276,191 | 6/1981 | Karayannis et al. | 252/429 C |
| 4,295,992 | 10/1981 | Gibbs | 252/429 C |

OTHER PUBLICATIONS

Furusato Chem. Abstracts 91(1979) #124233.

Ikegami Chemical Abstracts 89(1978) #197707.

Primary Examiner—Arthur P. Demers
Attorney, Agent, or Firm—Sprung, Horn, Kramer & Woods

[57] ABSTRACT

An olefin polymerization catalyst comprising a solid catalyst (I) and an organometallic compound (II), wherein said solid catalyst (I) is obtainable by reacting an organomagnesium compound (a) soluble in hydrocarbon solvent and represented by the following formula:

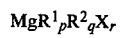

$MgR^1{}_pR^2{}_qX_r$ (in the formula, $R^1$ and $R^2$, identical or different, represent a secondary or tertiary alkyl group having 4-6 carbon atoms, X represents a negative group containing O, N or S atom, p and q represent a number of 0-2, r represents a number of 0-1, and p, q and r satisfy: $p+q+r=2$) with a compound of titanium or vanadium having at least one halogen atom (b), has a high activity, is uniform, has a high density, is suitable for continuous polymerization of olefins, and enables to omit the catalyst removal step after the polymerization reaction.

An olefin polymerization catalyst obtainable by replacing the solid catalyst (I) with a solid type catalyst (I') obtainable by further reacting solid catalyst (I) with compound (b) or with an organic or inorganic compound of aluminum, silicon, tin or antimony (c), and catalysts obtainable by adding a halogenated hydrocarbon (III) to the above-mentioned olefin polymerization catalysts give polyolefins having a broad molecular weight distribution.

20 Claims, No Drawings

OLEFIN POLYMERIZATION CATALYST AND A PROCESS FOR PRODUCING POLYOLEFINS BY THE USE OF SAID CATALYST

TECHNICAL FIELD

This invention relates to a novel olefin polymerization catalyst having a high activity.

BACKGROUND ART

The low pressure production process of polyethylene using a catalyst comprising an organomagnesium compound and a transition metal compound is already publicly known in the patent of K. Ziegler (Japanese Patent Publication No. 1546/1957). However, organomagnesium compound itself is insoluble in the inert hydrocarbon media used for the synthesis of catalyst and the polymerization reaction, so that it has never been used effectively and no success has ever been achieved in obtaining a high activity therefrom.

As catalysts of which activity is enhanced by using an organomagnesium compound in a specific form, there are known systems using, for example, an ether complex of organomagnesium halogenide, the so-called Grignard reagent, or one using organomagnesium alkoxide (Japanese Patent Publication No. 40,959/1972; Japanese Patent Kokai (Laid-Open) No. 19,274/1971). Though these catalysts exhibit a considerably high activity per atom of transition metal, they are still insufficient to omit the catalyst removal step of the polyethylene production process completely in that the halogen remains in the liquid reaction mixture to such an extent as being not disregarded.

The present inventors had already discovered a series of catalyst systems using a complex compound soluble in inert hydrocarbons. These catalysts systems comprise an organomagnesium compound together with an organoaluminum compound, an organozinc compound, an organoboron compound and an organoberyllium compound, respectively. (U.S. Pat. Nos. 3,989,878, 4,004,071, 4,027,087). These catalyst systems have a much higher activity than the above-mentioned disclosed catalysts and enable to omit the catalyst removal step completely.

DISCLOSURE OF INVENTION

As the result of further studies on the catalysts using an organomagnesium component, it was found that, surprisingly, a quite excellent catalyst of high activity for olefin polymerization can be obtained by the reaction between an organometallic compound and a specific solid obtainable by reacting a specific organomagnesium compound soluble in inert hydrocarbons with a titanium or vanadium compound, instead of using the above-mentioned complex of organomagnesium compound and organometallic compound. Based on this finding, this invention was accomplished.

Thus, this invention provides an olefin polymerization catalyst comprising a solid catalyst (I) and an organometallic compound (II), said solid catalyst (I) being obtained by reacting an organomagnesium compound (a) soluble in hydrocarbon solvents and represented by the following formula:

$$MgR^1_p R^2_q X_r$$

wherein $R^1$ and $R^2$ may be identical or different, and represent a secondary or tertiary alkyl group having 4-6 carbon atoms, X represents a negative group containing O, N or S atom, p and q represent a number of 0 to 2, r represents a number of 0 to 1, and p, q and r satisfy an equation: $p+q+r=2$, with a titanium or vanadium compound (b) having at least one halogen atom. This invention also provides a process for producing polyolefins by the use of said catalyst.

The first characteristic feature of the catalyst of this invention is that the catalytic efficiency is extremely high. Owing to the effect, the quantity of catalyst residue such as transition metal, halogen and the like remaining in polymer is small and the catalyst is suitable for use in a process from which the step of catalyst removal is omitted. The second characteristic feature is that the formed polymer has quite excellent particle characteristics such that the particle size of polymer is uniform, the polymer contains no coarse particles making trouble in the continuous polymerization, and the polymer has a high bulk density. The third characteristic feature is that the production of a polymer having a high molecular weight, a high stiffness, a sharp molecular weight distribution and a high impact strength can be achieved.

Another aspect of this invention provides an olefin polymerization catalyst comprising a combination of solid type catalyst (I') and an organometallic compound (II), said solid type catalyst (I') being a reaction product between a solid catalyst (I) to be combined with an organometallic compound (II) and an inorganic or organic aluminum, silicon, tin or antimony compound and/or a reaction product between said solid catalyst (I) and a titanium or vanadium compound having at least one halogen atom. By the use of this catalyst, a polymer having a relatively broad molecular weight distribution is obtained.

Still another aspect of this invention provides also an olefin polymerization catalyst in which the above-mentioned combination of solid catalyst (I) or solid type catalyst (I') and organometallic compound (II) is further combined with a halogenated hydrocarbon (III). By the use of this catalyst, it is also possible to produce a polymer having a broad molecular weight distribution and suitable for blow molding and formation of film and sheet by means of extrusion process.

BEST MODE FOR CARRYING OUT THE INVENTION

Hereunder, the various components used in the catalyst of this invention will be explained in detail. The organomagnesium compound (hereinafter referred to as component (a)) used for the synthesis of solid catalyst (I) is represented by the following formula:

$$MgR^1_p R^2_q X_r$$

wherein $R^1$, $R^2$, X, p, q and r are as defined above.

In the formula mentioned above, the hydrocarbon group represented by $R^1$ and $R^2$ is a secondary or tertiary alkyl group having 4-6 carbon atoms. Its typical examples include sec-$C_4H_9$,

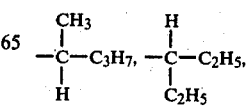

-continued

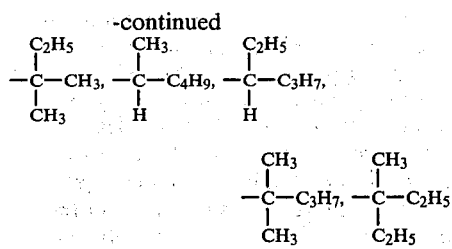

and the like. They are preferably a secondary alkyl group, and particularly preferably a sec-butyl group. Also, it is possible to use mixtures of them with magnesium compounds having straight chain alkyl group so far as they can retain a solubility in inert hydrocarbon. Examples of the negative group containing O, N or S atom, represented by X, include alkoxy groups, siloxy groups, aryloxy groups, amino groups, amido groups,

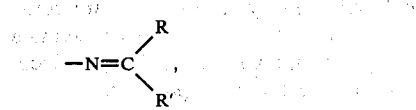

—SR", β-ketoacid residues and the like, wherein R, R' and R" are hydrocarbon groups. Preferably alkoxy groups or siloxy groups are used. p and q are each a number from 0 to 2, r is a number from 0 to 1, and they have a relation of: p+q+r=2. In order to obtain a particularly high activity, r is preferably selected from the range of 0–0.6, and r is an important factor for making the molecular distribution sharp. In this invention, the effect of giving a sharp molecular weight distribution to the resulting polymer with a high activity can be achieved when r is in the range of 0.2 to 0.6.

These organomagnesium compounds can be synthesized by reacting an organolithium compound represented by RLi, wherein R has the same meanings as $R^1$ or $R^2$, with $MgZ_2$ wherein Z is halogen atom (J. Organic Chem. 34 1116–1121 (1969)). The introduction of negative group X is carried out by a reaction of organomagnesium compound represented by the following formula:

$$MgR^1_p R^2_q$$

wherein $R^1$, $R^2$, p and q are as defined above, with oxygen, alcohol, organic acid, ester of organic acid, aldehyde, ketone, silanol, siloxane, amine, nitrile, mercaptan or the like. Examples of these reagents include ethanol, propanol, butanol, hexanol, octanol, acetic acid, propionic acid, butanoic acid, benzoic acid, methyl acetate, butyl propionate, acetaldehyde, acetone, methyl ethyl ketone, acetylacetone, trimethylsilanol, triphenylsilanol, dimethyldihydrodisiloxane, cyclic methylhydrotetrasiloxane, methylhydropolysiloxane, phenylhydropolysiloxane, acetonitrile, benzonitrile, methylamine, dimethylamine, ethylamine, diethylamine, phenylamine, methyl mercaptan, propyl mercaptan, butyl mercaptan and the like.

Next, as the titanium or vanadium compound (hereinafter referred to as component (b)) having at least one halogen atom used for the production of solid catalyst (I), halogenides, oxyhalogenides and alkoxyhalogenides of titanium and vanadium, such as titanium tetrachloride, titanium tetrabromide, titanium tetraiodide, ethoxytitanium trichloride, propoxytitanium trichloride, butoxytitanium trichloride, dibutoxytitanium dichloride, tributoxytitanium monochloride, vanadium tetrachloride, vanadyl trichloride, monobutoxyvanadyl dichloride, dibutoxyvanadyl dichloride and the like are used either alone or in the form of mixture. Among them, compounds having 3 or more halogen atoms are preferable, and titanium tetrachloride is particularly preferable.

The reaction between organomagnesium compound (a) and titanium or vanadium compound (b) is carried out at a temperature up to 150° C., preferably at a low temperature of 50° C. or below, in an inert reaction medium, for example, an aliphatic hydrocarbon such as hexane or heptane, an aromatic hydrocarbon such as benzene, toluene or xylene, or an alicyclic hydrocarbon such as cyclohexane or methylcyclohexane. In order to obtain a catalyst having a high activity, the molar ratio component (a): component (b) in the reaction is recommendably in the range of 0.05–50, preferably 0.2–10 and particularly preferably 0.5–5. In order to achieve a particularly excellent catalytic efficiency, the method of simultaneous addition, i.e. the method comprising carrying out the reaction while introducing these two catalyst components into the reaction zone, is most desirable.

Though composition and structure of the solid catalyst obtainable by the above-mentioned reaction vary in a wide range depending upon the kind of starting materials and reaction conditions, they are roughly in the following range. That is, molar ratio (Ti+V)/Mg of the solid catalyst is in the range of 0.1–5. This solid surface has a very large specific surface area. According to a measurement by B. E. T. method, it is as great as 50 $m^2/g$ to 400 $m^2/g$.

As the organic or inorganic aluminum, silicon, tin or antimony compound (hereinafter referred to as component (c)), used in the reaction with solid catalyst (I) for the purpose of producing solid type catalyst (I') those compounds having halogen atom, hydrogen atom, hydrocarbon group, alkoxy group or aryloxy group can be mentioned. Examples of such compounds include alkoxyaluminum dihalide, alkylaluminum dihalide, monoalkoxysilicon halide, monoalkylsilicon halide, silicon tetrahalogenide, monoalkoxytin halide, monoalkyltin halide, tin tetrahalogenic, antimony pentachloride, monoalkylantimony halide and the like. Among these compounds, alkylaluminum dichloride, silicon tetrachloride, and tin tetrachloride are particularly preferable. As the titanium or vanadium compound having at least one halogen atom (hereinafter referred to as component (d)), the same compound (component b)) as used for the synthesis of the solid catalyst (I) or other compound belonging to component (b) can be used.

The reaction with the solid catalyst is carried out by using component (c) or component (d) in an amount of 1–50 millimoles and preferably 2–20 millimoles per 1 g of the solid catalyst, at a temperature ranging from room temperature to 150° C. either in an invert hydrocarbon medium or in the absence of inert hydrocarbon medium. After completion of the reaction, the resulting solid type catalyst is separated, and preferably it is washed with an inert hydrocarbon. The reaction of the solid catalyst with component (c) or component (d) can be carried out multistage-wise, i.e. in two or three steps, by using the same or different compound selected from these components.

Though the solid catalyst or solid type catalyst thus obtained is useful even as it is, as a catalyst for olefin polymerization, it is converted to a more excellent catalyst by combining it with an organometallic compound (II) according to this invention. As said organometallic compound, compounds of the elements belonging to Group I-II of the Periodic Table are useful, among which organoaluminum compounds and complexes containing organomagnesium are particularly preferable.

As the organoaluminum compounds (II) used in this invention, compounds represented by the following formula:

$$AlR^3{}_n Y_{3-n}$$

wherein $R^3$ is hydrocarbon group having 1–20 carbon atoms, Y is a member selected from the group consisting of hydrogen atom, halogen atom, alkoxy group, aryloxy group and siloxy group, and n is a number of 2–3, can be referred to, and they are used either alone or in the form of a mixture. In the formula mentioned above, the hydrocarbon group having 1–20 carbon atoms represented by $R^3$ includes aliphatic hydrocarbons, aromatic hydrocarbons and alicyclic hydrocarbons.

Recommendable examples of these compounds include triethylaluminum, tri-n-propylaluminum, tri-isopropylaluminum, tri-n-butylaluminum, tri-isobutylaluminum, trihexylaluminum, trioctylaluminum, tridecylaluminum, tridodecylaluminum, trihexadecylaluminum, diethylaluminum hydride, diisobutylaluminum hydride, diethylaluminum ethoxide, diisobutylaluminum ethoxide, dioctylaluminum butoxide, diisobutylaluminum octyloxide, diethylaluminum chloride, diisobutylaluminum chloride, dimethylhydroxyaluminum demethyl, ethylmethylhydroxyaluminum diethyl, ethyldimethylsiloxyaluminum diethyl and the like and mixtures thereof.

By combining these alkylaluminum compounds with the above-mentioned solid catalyst (I) or solid type catalyst (I') (hereinafter they are sometimes collectively represented by "solid catalyst"), a catalyst of high activity is obtained. Particularly, trialkylaluminum and dialkylaluminum hydride are preferable because they enable to achieve the highest activity. Though if a negative group Y is introduced into trialkylaluminum or dialkylaluminum hydride their activity tends to drop, the products exhibit respective unique polymerization behavior and enable to produce useful polymers with a high activity. For example, if an alkoxy group is introduced, control of molecular weight becomes easy. As a negative group alkoxy group and siloxy group are desirable in that they do not contain any halogen.

The solid catalyst component (I or I') and the organometallic compound (II) may be combined together by adding them into the polymerization system under the conditions of polymerization or they may be combined together beforehand prior to polymerization. Proportion between the two components to be combined is preferably in the range of 1–3,000 millimoles of organometallic compound per 1 g of the solid catalyst.

Further, the olefin polymerization catalyst of this invention enables to produce a polymer of broad molecular weight distribution with a high activity by combining the above-mentioned solid catalyst (I or/and I') and organometallic compound (II) with a halogenated hydrocarbon (III). As said halogenated hydrocarbon, there are used saturated or unsaturated hydrocarbons having 1–10 carbon atoms, and preferably halogenated hydrocarbons in which the number of halogen atoms is twice or less the number of carbon atoms. Examples of such compound include dichloromethane, 1,2-dichloroethane, 1,1,2-trichloroethane, 1,1,2,2-tetrachloroethane, 1,2-dichloropropane, 1,3-dichloropropane, 1,2,3-trichloropropane, n-butyl chloride, isobutyl chloride, 1,4-dichlorobutane, 2,3-dichlorobutane, 1,2,3,4-tetrachlorobutane, n-hexyl chloride, 1,6-dichlorohexane, 1,2-dichlorooctane, dibromomethane, 1,2-dibromoethane, n-butyl bromide, chlorobenzene, phenethyl chloride, allyl chloride, bromobenzene, ethyl iodide and the like.

The combination of these halogenated hydrocarbon (III), the above-mentioned solid catalyst (I and/or I') and the organometallic compound (II) may be carried out under the conditions of polymerization with the progress of reaction, or these three members may be combined beforehand prior to the polymerization. Further, the polymerization may be carried out by once reacting the solid catalyst with the halogenated hydrocarbon to isolate the solid product, thereafter combining the solid catalyst thus obtained with the organometallic compound, and newly adding same or different halogenated hydrocarbon or without addition thereof. As for the proportion of catalyst components to be reacted, it is desirable that 1–3,000 millimoles of organometallic compound and 1–3,000 millimiles of halogenated hydrocarbon are used per 1 g of solid catalyst and molar ratio of organometallic compound to halogenated hydrocarbon is 0.01–100 and preferably 0.1–20.

The olefin which can be polymerized by the use of the catalyst of this invention is α-olefin, and particularly ethylene. Further, the catalyst of this invention can also be used for copolymerizing ethylene with coexisting monoolefin such as propylene, butene-1, hexene-1 or the like or coexisting diene such as butadiene, isoprene or the like or for polymerizing propylene with a high efficiency.

As the process of polymerization, usual suspension polymerization, solution polymerization and gaseous polymerization can be employed. In the case of suspension polymerization and solution polymerization, the catalyst is introduced into a reactor together with a solvent for polymerization such as aliphatic hydrocarbon, e.g. hexane or heptane, aromatic hydrocarbon, e.g. benzene, toluene or xylene, or alicyclic hydrocarbon, e.g. cyclohexane or methylcyclohexane, ethylene is pressed into the reactor up to a pressure of 1–200 kg/cm² (gage) under an inert atmosphere, and the polymerization is set forward at a temperature ranging from room temperature to 300° C. On the other hand, the gaseous polymerization can be carried out at an ethylene pressure of 1–50 kg/cm² (gage) under a temperature condition of room temperature to 120° C. by using procedures such as fluidized bed, moving bed or mixing with agitator so as to realize a satisfactory contact between ethylene and the catalyst.

The polymerization may be carried out by the method of one-step polymerization using one reaction zone, or it may also be carried out by the so-called multi-step method using a plurality of reaction zones. A polymer having a broader molecular weight distribution can be produced by carrying out the polymerization under two or more different conditions, and this technique is quite excellently suitable for the production of a product to be molded by blow molding or film molding process. Further, in order to control the molecular weight of polymer, it is also possible to add hydrogen or an organometallic compound easily causing a chain transfer reaction. Furthermore, it is also possible to carry out the polymerization in combination with a technique for density control by means of adding a titanic acid ester.

Examples of this invention will be shown below. This invention is by no means limited by these samples.

In the examples, weight average molecular weight $M_w$ was determined according to the following equation:

$$[\eta] = 6.8 \times 10^{-4} M_w^{0.67}$$

(cf. Journal of Polymer Science, 36, 91 (1957)), while $M_w/M_n$, i.e. the index of molecular weight distribution, was determined by G. P. C. (gel permeation chromatography) method. In the examples, the term "catalytic efficiency" represents the quantity of polymer formed per 1 g of solid catalyst, 1 hour of reaction time and 1 kg/cm$^2$ of ethylene pressure.

EXAMPLE 1

(I) Synthesis of Organomagnesium Compound (a)

Into a 500 ml flask replaced with nitrogen were introduced 24 g (250 mmoles) of anhydrous magnesium chloride and 50 ml of n-heptane, to which was added 100 ml of 1.3 N solution of sec-C$_4$H$_9$Li in cyclohexane at room temperature with stirring. After stirring for 30 minutes, residue of the reaction was filtered off to obtain a solution having a magnesium concentration of 0.55 moles/liter (the procedure was according to the method of Journal of Organic Chemistry, 34, 1116 (1969)). To 180 ml of a heptane solution containing 100 mmoles of the (sec-C$_4$H$_9$)$_2$Mg thus synthesized was added 50 mmoles of n-butanol at 10° C. over a time period of 30 minutes. A portion of the resulting solution was sampled out and Mg and butoxy group were analyzed to reveal that molar ratio n-C$_4$H$_9$O-/Mg=0.5.

(II) Synthesis of Solid Catalyst (I)

Oxygen and moisture present inside a flask having a capacity of 500 ml and equipped with two dropping funnels were removed by replacement with dry nitrogen. 160 ml of n-heptane was added to the flask and cooled to −10° C. Then, 80 ml of the above-mentioned solution containing 40 mmoles of (sec-C$_4$H$_9$)$_{1.5}$Mg(O-n-C$_4$H$_9$)$_{0.5}$ in n-heptane and 80 ml of a solution containing 40 mmoles of titanium tetrachloride in n-heptane were accurately measured into separate dropping funnels. Both the components were simultaneously added to the flask with stirring at −10° C. over a time period of 1 hour, after which they were aged and reacted at this temperature for 3 hours. The resulting solid, insoluble in hydrocarbon, was isolated, washed with n-heptane and dried to give 9.7 g of a solid.

(III) Polymerization Reaction

Five mg of the solid catalyst synthesized in (II) and 0.4 mmole of triisobutylaluminum were introduced, together with 0.8 liter of dehydrated and deaerated n-heptane, into a 1.5 liter autoclave of which inner atmosphere had been deaerated to vacuum and replaced with nitrogen. While keeping inner temperature of the autoclave at 85° C., hydrogen was introduced to a pressure of 1.2 kg/cm$^2$ (gage) and then ethylene was introduced until the total pressure reached 4.0 kg/cm$^2$ (gage). While keeping the total pressure at 4.0 kg/cm$^2$ (gage) by supplying ethylene, the polymerization was carried out for 1 hour to obtain 147 g of a polymer.

$M_w$ was 51,000, $M_w/M_n$ was 4.8, and catalytic efficiency was 10,500. Bulk density of this polymer was 0.39 g/cc and its particle size distribution was as follows:

| Mesh | 20 | 28 | 35 | 48 | 70 | 100 | 145 | 200 | 280 | 280 pass |
|---|---|---|---|---|---|---|---|---|---|---|
| % by wt. | — | — | 1.1 | 18.6 | 61.8 | 17.5 | 1.0 | — | — | — |

EXAMPLES 2–10

Solid catalysts (I) were obtained by reacting the organomagnesium compounds (component (a)) shown in Table I with the titanium or vanadium compounds having at least one halogen atom (component (b)) shown there under the conditions of the table according to the procedure of Example 1. Using these solid catalysts together with the organometallic compounds (component (II)) and halogenated hydrocarbons (component (III)) shown in Table I, polymerization of ethylene was carried out according to the procedure and conditions of Example 1.

The results are shown in Table I.

EXAMPLES 11–20

The procedure of Example I was repeated to obtain polyethylenes, except that solid type catalysts (I') were used together with the components (II) and (III) shown in Table II, wherein said solid type catalysts (I') were obtained by reacting solid catalysts (I) synthesized according to the conditions of Example 1 with the inorganic or organic aluminum, silicon, tin or antimony compounds (component (c)) shown in Table II or with the titanium or vanadium compounds having at least one halogen atom (component (d)) shown there.

The results are shown in Table II.

TABLE I

| | | | Conditions of synthesis of solid catalyst (I) | | | |
|---|---|---|---|---|---|---|
| | | | Addition condition | | Aging condition | |
| Example | Component (b) (mmole) | Component (a) (mmole) | Temperature (°C.) | Time (hr.) | Temperature (°C.) | Time (hr.) |
| 2 | TiCl$_4$ (80) | (sec-C$_4$H$_9$)$_2$Mg (40) | −5 | 2 | 5 | 2 |
| 3 | TiCl$_4$ (60) | 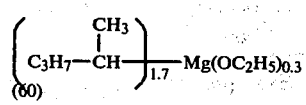 | −5 | 2 | 20 | 1 |

$$\left( C_3H_7 - \underset{|}{\overset{CH_3}{CH}} - \right)_{1.7} Mg(OC_2H_5)_{0.3}$$
(60)

TABLE I-continued

| Example | | | | | | |
|---|---|---|---|---|---|---|
| 4 | TiCl$_4$ (80) | sec-C$_4$H$_9$Mg n-C$_4$H$_9$ (60) | | −10 | 1 | 0 | 3 |
| 5 | TiCl$_{3.5}$(OC$_4$H$_9$)$_{0.5}$ (100) | $\left( \begin{array}{c} C_2H_5 \\ \phantom{C}\diagdown \\ C_2H_5 \diagup \end{array} CH \right)_{1.9}$ Mg[OSi(CH$_3$)$_2$]$_{0.1}$ H (65) | | −5 | 2 | 40 | 6 |
| 6 | TiCl$_3$(OC$_4$H$_9$) (40) | (tert-C$_4$H$_9$)$_2$Mg (50) | | 10 | 3 | 10 | 1 |
| 7 | VCl$_4$ (40) | $\left( C_4H_9 - \underset{\underset{CH_3}{|}}{CH} \right)_{1.2}$ Mg(OC$_8$H$_{17}$)$_{0.8}$ (40) | | 0 | 2 | 25 | 2 |
| 8 | TiBr$_4$ (60) | $\left( (CH_3)_2 - \underset{\underset{C_2H_5}{|}}{C} \right)_{1.7}$ Mg[OSi(C$_2$H$_5$)$_2$]$_{0.3}$ H (80) | | −5 | 2 | 5 | 1 |
| 9 | TiCl$_4$ | (sec-C$_4$H$_9$)$_{1.4}$Mg(On—Bu)$_{0.6}$ | | −10 | 1 | −10 | 3 |
| 10 | TiCl$_4$ | (sec-C$_4$H$_9$)$_{1.1}$Mg(On—Bu)$_{0.9}$ | | −10 | 1 | −10 | 3 |

| | Conditions of polymerization | | Results of polymerization | | | |
|---|---|---|---|---|---|---|
| Example | Component (II) (mmole) | Component (III) (mmole) | Catalytic efficiency | $M_w$ | $M_w/M_n$ | Bulk density (g/cc) |
| 2 | Al(i-C$_4$H$_9$)$_3$ (0.2) | ClCH$_2$CH$_2$Cl (0.2) | 8900 | 94000 | 19.6 | 0.41 |
| 3 | Al(C$_2$H$_5$)$_3$ (0.5) | — | 9400 | 59000 | 4.7 | 0.37 |
| 4 | AlH(C$_2$H$_5$)$_2$ (0.1) | CH$_2$Cl$_2$ (0.4) | 8300 | 87000 | 18.9 | 0.38 |
| 5 | Al(C$_8$H$_{17}$)$_3$ (0.4) | — | 9100 | 63000 | 5.1 | 0.36 |
| 6 | Al(i-C$_4$H$_9$)$_3$ (0.2) | — | 7100 | 83000 | 6.4 | 0.39 |
| 7 | Al(i-C$_4$H$_9$)$_3$ (0.2) | ClCH$_2$CHCH$_3$ $\vert$ Cl (0.1) | 6700 | 52000 | 16.2 | 0.35 |
| 8 | Al(C$_2$H$_5$)$_2$(OC$_2$H$_5$) (1.0) | — | 6400 | 79000 | 10.6 | 0.37 |
| 9 | Al(i-C$_4$H$_9$)$_3$ (0.4) | — | 8200 | 56000 | 4.2 | 0.38 |
| 10 | Al(i-C$_4$H$_9$)$_3$ (0.4) | — | 5200 | 49000 | 4.0 | 0.34 |

TABLE II

| | Conditions of synthesis of solid type catalyst (I') | | | | | Conditions of polymerization | | Results of polymerization | | | |
|---|---|---|---|---|---|---|---|---|---|---|---|
| Example | Solid catalyst (g) | Component (c) or (d) | mmole | Heptane (ml) | Temperature (°C.) | Time (hour) | Component (II) (mmole) | (III) (mmole) | Catalytic efficiency | $M_w$ | $M_w/M_n$ | Bulk density (g/cc) |
| 11 | 2 | AlCl$_2$(OC$_5$H$_{11}$) | 6 | 70 | 30 | 2 | Al(i-C$_4$H$_9$)$_3$ (1.0) | — | 8900 | 85000 | 16.5 | 0.38 |
| 12 | 2 | Al(C$_2$H$_5$)$_2$Cl | 10 | 70 | 60 | 3 | Al(i-C$_4$H$_9$)$_3$ (0.4) | Cl$_2$CHCHCl$_2$ (0.1) | 7700 | 92000 | 18.8 | 0.37 |
| 13 | 2 | Al(i-C$_4$H$_9$)$_{1.5}$Cl$_{1.5}$ | 4 | 70 | 60 | 3 | C$_2$H$_5$OAl(C$_2$H$_5$)$_2$ (2.0) | — | 9100 | 74000 | 17.1 | 0.42 |
| 14 | 2 | CH$_3$SiCl$_3$ | 30 | 70 | 60 | 3 | C$_2$H$_5$OAl(C$_2$H$_5$)$_2$ (2.0) | — | 8500 | 69000 | 16.3 | 0.36 |
| 15 | 2 | SiCl$_4$ | 35 | 100 | 60 | 3 | | | | | | |
| 16 | 2 | SnCl$_4$ | 7 | 100 | 80 | 2 | | | | | | |
| 17 | 2 | SbCl$_5$ | 16 | 100 | 80 | 2 | (C$_2$H$_5$)$_2$Al(OSiC$_2$H$_5$) $\vert$ CH$_3$ H (1.5) | — | 6100 | 67000 | 16.9 | 0.37 |
| 18 | 2 | TiCl$_4$ | 100 | — | 130 | 1 | | | | | | |
| 19 | 2 | VCl$_4$ | 8 | 200 | 80 | 3 | Al(i-C$_4$H$_9$)$_2$H (0.4) | CH$_2$=CHCl (0.2) | 6500 | 85000 | 19.2 | 0.41 |
| 20 | 2 | TiCl$_{3.5}$(Oi-C$_3$H$_7$)$_{0.5}$ | 13 | 200 | 80 | 3 | Al(i-C$_4$H$_9$)$_3$ (0.2) | — | 6300 | 88000 | 17.3 | 0.35 |
| | | | | | | | Al(i-C$_4$H$_9$)$_3$ (0.2) | CH$_2$Br (0.2) | 7200 | 75000 | 18.8 | 0.47 |

TABLE II-continued

| | | | | |
|---|---|---|---|---|
| Al(i-C$_4$H$_9$)$_3$ (5.0) | — | 6000 | 76000 | 6.8 | 0.46 |
| Al(i-C$_4$H$_9$)$_3$ (2.5) | — | 9200 | 59000 | 7.2 | 0.48 |

EXAMPLE 21

Two g of the solid catalyst obtained in Example 1 was introduced into a 200 ml flask, previously replaced with nitrogen, together with 70 ml of heptane and 4 mmoles of silicon tetrachloride and reacted at 60° C. for 1 hour. The supernatant was removed by decantation. The residue was twice washed with 50 ml of n-heptane by decantation. Then, 15 mmoles of titanium tetrachloride and 60 ml of n-heptane were added and reacted at 90° C. for 4 hours. The resuslting solid catalyst was separated, washed with n-heptane and dried. Then the procedure of Example 1 was repeated, except that the solid type catalyst obtained above was used, and there was obtained 108 g of a polymer. $M_w$ was 62,000, $M_w/M_n$ was 17.1, bulk density was 0.46 g/cc, and catalytic efficiency was 7,700.

EXAMPLES 22-24

Polymers were obtained by repeating the procedure of Example 21, except that components (c) and (d) shown in Table III were used. The results are as shown in Table III.

TABLE III

| Example | Component (c) (mmole) | Component (d) (mmole) | Catalytic efficiency | $M_w$ | $M_w/M_n$ | Bulk density (g/cc) |
|---|---|---|---|---|---|---|
| 22 | Al(i-C$_4$H$_9$)$_2$Cl (6) | TiCl$_4$ (2) | 7,900 | 3,000 | 17.2 | 0.48 |
| 23 | HSiCl$_3$ (3) | TiCl$_4$ (7) | 6,200 | 75,000 | 16.8 | 0.49 |
| 24 | Sb(C$_2$H$_5$)$_3$Cl$_2$ (16) | TiBr$_4$ (3) | 7,400 | 63,000 | 16.5 | 0.48 |

We claim:

1. An olefin polymerization catalyst comprising solid catalyst (I) and organometallic compound (II), said solid catalyst being obtained by reacting an organomagnesium compound (a) soluble in hydrocarbon solvent and represented by the following formula:

$$MgR^1_p R^2_q X_r$$

wherein
R$^1$ and R$^2$ are identical or different and represent a secondary or tertiary alkyl group having 4-6 carbon atoms,
X represents a member selected from the group consisting of alkoxy groups, siloxy groups, aryloxy groups, amino groups, amido groups,

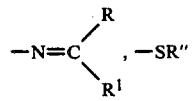

wherein R, R' and R" are hydrocarbon groups and β-ketoacid residues,
p and q represent a number from 0 to 2,
$0 \leq r \leq 1$, and p, q and r satisfy the following equation:

$$p+q+r=2,$$

with a halogenide, oxyhalogenide or alkoxyhalogenide of titanium or vanadium (b).

2. An olefin polymerization catalyst according to claim 1, wherein X is an alkoxy group or siloxy group.

3. An olefin polymerization catalyst according to claim 1, wherein the value of r satisfies $0 \leq r \leq 0.6$.

4. An olefin polymerization catalyst according to claim 1, wherein the value of r satisfies $0.2 \leq r \leq 0.6$.

5. An olefin polymerization catalyst according to claim 1, wherein the titanium or vanadium compound (b) has 3 or more halogen atoms.

6. An olefin polymerization catalyst according to claim 1, wherein the titanium compound (b) is titanium tetrachloride.

7. An olefin polymerization catalyst according to claim 1, wherein the molar ratio of organomagnesium compound (a) to titanium or vanadium compound (b), i.e. Mg/(Ti+V), is 0.2-10, and preferably 0.5-5.

8. An olefin polymerization catalyst according to claim 1, wherein said organometallic compound (II) is an organoaluminum compound represented by the following formula:

$$AlR^3_n Y_{3-n}$$

wherein R$^3$ represents a hydrocarbon group having 1-20 carbon atoms, Y is a member selected from the group consisting of hydrogen atom, halogen atom, alkoxy group, aryloxy group and siloxy group, and n is a number of 2-3.

9. An olefin polymerization catalyst according to claim 1, wherein said organometallic compound (II) is trialkylaluminum or dialkylaluminum hydride.

10. An olefin polymerization catalyst comprising solid type catalyst (I') and organometallic compound (II), said solid type catalyst (I') being a solid reaction product between the solid catalyst (I) defined in claim 1 and at least one compound of aluminum, silicon, tin or antimony having halogen atom, hydrogen, hydrocarbon, alkoxy or aryloxy bonded thereto (c), and a halogenide, oxyhalogenide or alkoxyhalogenide of titanium or vanadium (b).

11. An olefin polymerization catalyst according to claim 10, wherein said compound of aluminum, silicon, tin or antimony (c) contains at least one halogen atom bonded thereto and is soluble in hydrocarbon solvent.

12. An olefin polymerization catalyst according to claim 10, wherein said solid type catalyst (I') is a solid obtained by reacting solid catalyst (I) with compound (c) or (d) in a proportion of 1-50 millimoles of compound (c) or (d) per 1 g of solid catalyst (I) at a temperature of 0°-150° C.

13. An olefin polymerization catalyst according to claim 10, wherein the compound (d) has 3 or more halogen atoms.

14. An olefin polymerization catalyst according to claim 10, wherein the titanium compound (d) is titanium tetrachloride.

15. An olefin polymerization catalyst characterized in that the olefin polymerization catalyst of claim (1) contains a halogenated hydrocarbon (III) as an additional component.

16. An olefin polymerization catalyst according to claim 15, wherein said halogenated hydrocarbon (III) is a compound of which number of carbon atoms is 1-10 and of which number of halogen atoms is twice or less the number of carbon atoms.

17. An olefin polymerization catalyst according to claim 15, wherein the molar ratio between organometallic compound (II) and halogenated hydrocarbon (III) is 0.01–100.

18. An olefin polymerization catalyst characterized in that the olefin polymerization catalyst of claim 10 contains a halogenated hydrocarbon (III) as an additional component.

19. An olefin polymerization catalyst according to claim 18, wherein said halogenated hydrocarbon (III) is a compound of which number of carbon atoms is 1–10 and of which number of halogen atoms is twice or less the number of carbon atoms.

20. An olefin polymerization catalyst according to claim 18, wherein the molar ratio between organometallic compound (II) and halogenated hydrocarbon (III) is 0.01–100.

* * * * *